United States Patent
Chiu et al.

(10) Patent No.: US 10,755,489 B2
(45) Date of Patent: Aug. 25, 2020

(54) INTERACTIVE CAMERA SYSTEM WITH VIRTUAL REALITY TECHNOLOGY

(71) Applicant: SPEED 3D Inc., Taipei (TW)

(72) Inventors: Li-Chuan Chiu, Taipei (TW); Jui-Chun Chung, Taipei (TW); Hui-Chun Chen, Taipei (TW); Yi-Ping Cheng, Taipei (TW)

(73) Assignee: SPEED 3D Inc., Taipei (TW)

( * ) Notice: Subject to any disclaimer, the term of this patent is extended or adjusted under 35 U.S.C. 154(b) by 0 days.

(21) Appl. No.: 16/432,876

(22) Filed: Jun. 5, 2019

(65) Prior Publication Data

US 2020/0226844 A1 Jul. 16, 2020

(30) Foreign Application Priority Data

Jan. 14, 2019 (CN) .......................... 2019 1 0031146

(51) Int. Cl.
*G06T 19/20* (2011.01)
*G06T 19/00* (2011.01)
*G06T 13/40* (2011.01)
*G10L 21/003* (2013.01)
*G06F 3/01* (2006.01)

(52) U.S. Cl.
CPC .............. *G06T 19/20* (2013.01); *G06F 3/011* (2013.01); *G06T 13/40* (2013.01); *G06T 19/006* (2013.01); *G10L 21/003* (2013.01); *G06T 2200/04* (2013.01); *G06T 2200/24* (2013.01); *G06T 2219/2004* (2013.01)

(58) Field of Classification Search
CPC ....... G06T 19/20; G06T 13/40; G06T 19/006; G06T 2200/04; G06T 2200/24; G06T 2219/2008; G06T 2210/16; G06F 3/011; G10L 21/003

See application file for complete search history.

(56) References Cited

U.S. PATENT DOCUMENTS

| | | | |
|---|---|---|---|
| 2013/0110662 A1* | 5/2013 | Dezelak | G06Q 30/0613 705/26.1 |
| 2013/0257877 A1* | 10/2013 | Davis | A63F 13/12 345/473 |
| 2015/0302536 A1* | 10/2015 | Wahl | G06Q 50/00 705/2 |
| 2016/0110922 A1* | 4/2016 | Haring | G06T 13/40 345/633 |
| 2019/0196675 A1* | 6/2019 | German | G06K 9/00463 |

* cited by examiner

*Primary Examiner* — Haixia Du
(74) *Attorney, Agent, or Firm* — Winston Hsu

(57) ABSTRACT

An interactive camera system with virtual reality technology is provided. The system includes an augmented reality module, an accessory database, a voice database, and an integration module. The augmented reality module generates a virtual environment, and a user can combine a three-dimensional avatar substrate with a character image to form a three-dimensional avatar that displayed in the virtual environment. The accessory database and the voice database allow the user to select different accessory patterns and different voice modules for different types of three-dimensional avatar substrates. The integration module allows professional personnel to provide technical presentations, thesis introductions, or background introductions in the virtual environment, so that the presentations or the introductions can be performed with three-dimensional augmented reality effect.

8 Claims, 5 Drawing Sheets

INTERACTIVE CAMERA SYSTEM WITH VIRTUAL REALITY TECHNOLOGY

BACKGROUND OF THE INVENTION

1. Field of the Invention

The present invention relates to a camera system, in particular to an interactive camera system with virtual reality technology.

2. Description of the Prior Art

Different styles of humanoid dolls are displayed in the shops or in the claw machines. In particular, those customized humanoid dolls made according to the customer's requirements are called avatars. The avatars are popular since the avatars may have facial expressions or dresses similar to certain people.

In general, the avatars are made of plastic materials or other filling materials. However, along with the advancement of image processing technology as well as the advancement of mobile terminal performance, the facial expressions and the body features are required to be exquisite. As a result, the transmitting terminal has to take a plenty of resources for generating the image of an avatar. Thus, the power consumption of the terminal device becomes faster, and the processing time for generating the image of the avatar becomes longer. Moreover, a manufacture has to spend a considerable cost for applying the avatar technique to smartphone applications or to virtual environments.

SUMMARY OF THE INVENTION

An object of one or some embodiments of the present invention is to allow professional personnel to provide technical presentations, thesis introductions, or background introductions, so that the presentations or the introductions can be performed with three-dimensional augmented reality effect.

In view of these, an embodiment of the present invention provides an interactive camera system with virtual reality technology. The interactive camera system is adapted to be compiled as an application (APP). The interactive camera system comprises a portable electronic device for executing the APP, wherein the portable electronic device has an audiovisual capturing module for obtaining at least one character image and a recorded voice file, and the portable electronic device has a storage module for storing the at least one character image and the recorded voice file; an augmented reality (AR) module for generating a virtual environment, in which a three-dimensional avatar substrate is combined with the character image to form a three-dimensional avatar and the three-dimensional avatar is adapted to be displayed in the virtual environment; an accessory database for storing a plurality of accessory patterns, wherein each of the accessory patterns corresponds to different types of the three-dimensional avatar substrate, and each of the accessory patterns is adapted to be selected and applied to the three-dimensional avatar substrate; a voice database for storing a plurality of voice modules, wherein the voice modules are adapted to read the recorded voice file and change a voice effect of the recorded voice file; and an integration module adapted to integrate the three-dimensional avatar with one of the accessory patterns corresponding to the three-dimensional avatar or to integrate the three-dimensional avatar with one of the voice modules corresponding to the three-dimensional avatar, to generate a video file that includes the three-dimensional avatar.

In some embodiments, the system further comprises at least one visual effect module coupled to the AR module, wherein the visual effect module provides a visual effect in the virtual environment on the portable electronic device.

In some embodiments, the system further comprises a shopping module coupled to the AR module, wherein the shopping module is adapted to obtain commodity information of an outer label unit and to import the commodity information into the virtual environment to generate an augmented reality product image.

In some embodiments, the system further comprises a document database for storing document information.

In some embodiments, the system further comprises a voice simulation processing module coupled to the audiovisual capturing module and the document database, wherein the voice simulation processing module is adapted to combine the recorded voice file with the document information and presenting a combination of the recorded voice file and the document information in the virtual environment.

In some embodiments, the virtual environment is a hospital ward, a hospital lobby, or a virtual video studio capable of changing a background thereof.

In some embodiments, the character image is a face image, a facial feature image, or a body image.

In some embodiments, the three-dimensional avatar substrate is a human body model or a doll.

In some embodiments, when the three-dimensional avatar substrate is a human body model, the accessory patterns are selected from a group including eye, eyebrow, nose, mouth, body, face, hair, ear, neck, hand, and leg.

In some embodiments, the AR module is adapted to be applied to AR glasses, an AR helmet, a smartphone with AR function, a computer with an AR function, or a robot with an AR function.

DETAILED DESCRIPTION

These and other features, aspects and advantages of the present invention will become better understood with regard to the following description, appended claims, and accompanying drawings.

The structure, the proportion, and the size shown in the accompanying drawings in the specification are only used for illustration in cooperation with the contents disclosed in the specification, but not used for limiting the scope of the invention. The structure, the proportion, and the size which are adjusted according to requirements have the same effect are also in the scope of the invention. Moreover, the terms, such as "one", "two", "upper" and the like in the specification are used for simplicity and clarity, but not used for limiting the scope of the invention. The relative relation can be changed or adjusted without departing from as the scope of the invention.

Figure 1:
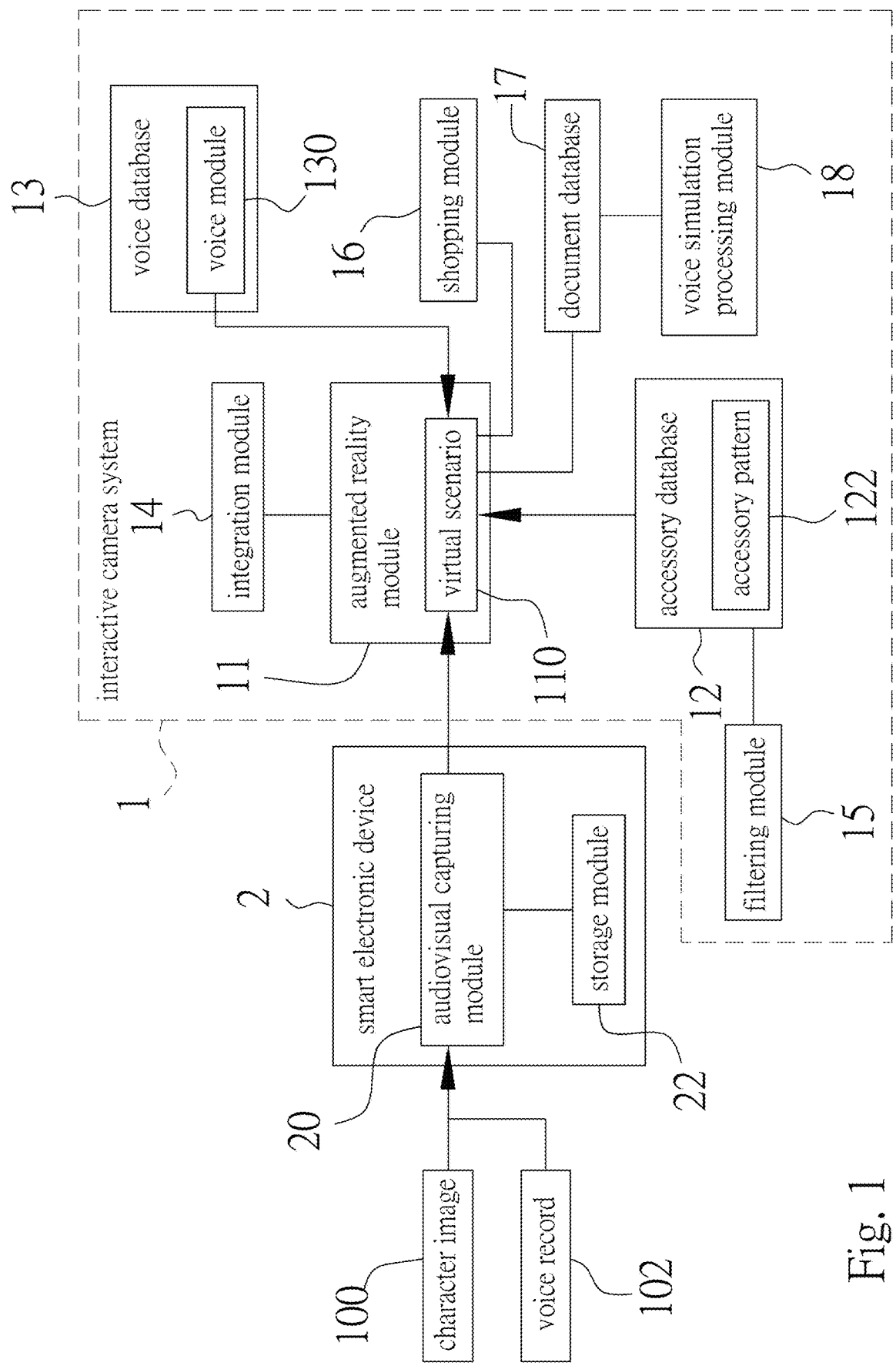
FIG. 1 illustrates a block diagram of an interactive camera system with virtual reality technology according to one embodiment of the present invention.
Figure 2:
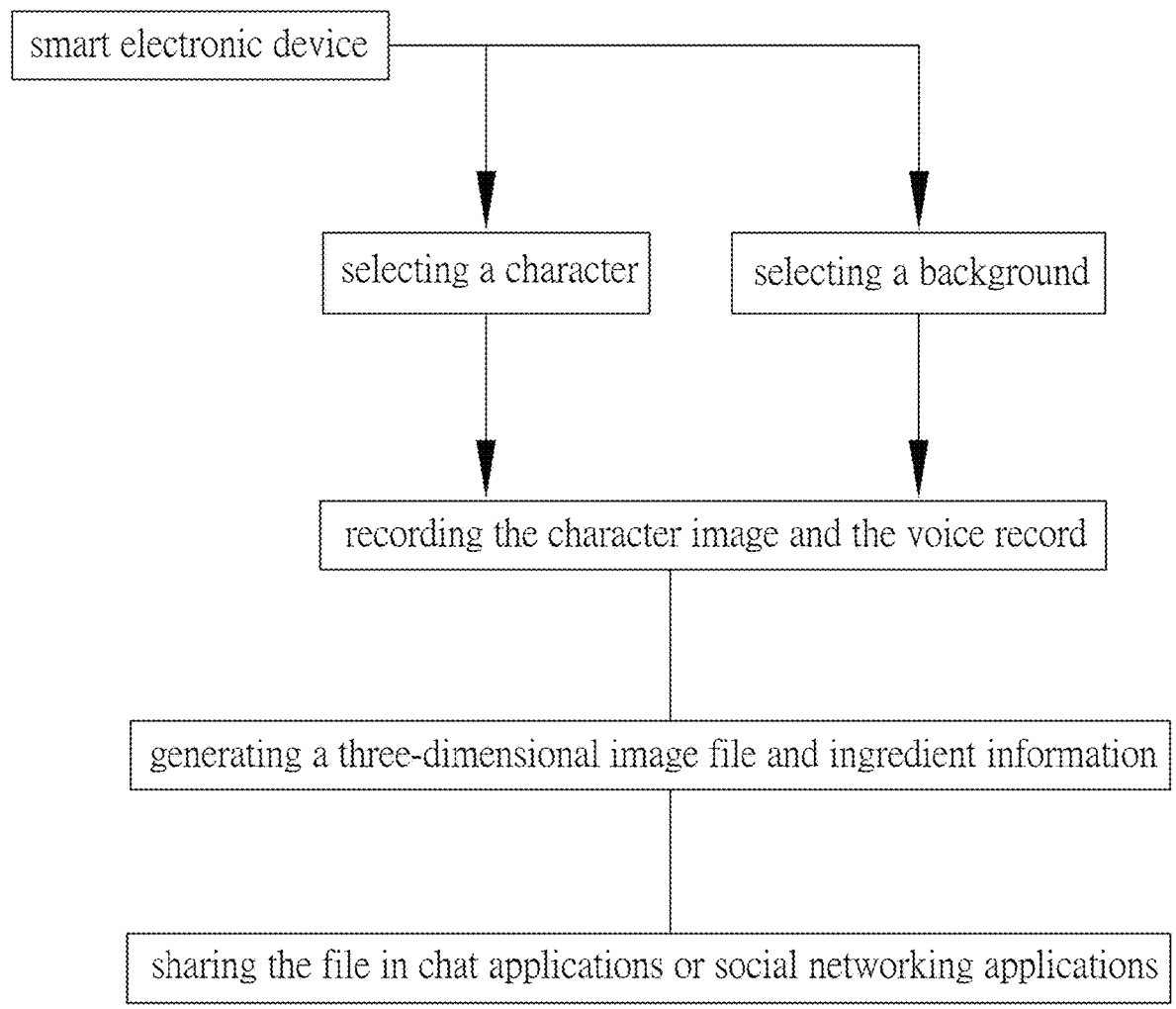
FIG. 2 illustrates a schematic flowchart showing the operation of an interactive camera system with virtual reality technology according to one embodiment of the present invention.

Please refer to FIGS. 1 and 2, respectively illustrating a block diagram of an interactive camera system with virtual reality technology and a schematic flowchart showing the operation of the interactive camera system, according to one embodiment of the present invention. As shown, an interactive camera system (hereinafter, system 1) with virtual reality technology is provided, and the system 1 is adapted to be compiled as an application (APP), a portable electronic device 2 is provided for executing the APP. The system 1 comprises an augmented reality (AR) module 11, an accessory database 12, a voice database 13, and an integration module 14.

The portable electronic device 2 is adapted to cooperate with the system 1 in the APP and to execute the APP. The portable electronic device 2 has an audiovisual capturing module 20 and a storage module 22. The audiovisual capturing module 20 allows the portable electronic device 2 to obtain at least one character image 100 (which may be a face image, a facial feature image, or a body image) and a recorded voice file 102. Next, the storage module 22 allows the portable electronic device 2 to obtain the at least one character image 100 and the recorded voice file 102. For example, the portable electronic device 2 may be a smartphone; the facial features of a character can be recognized using computer vision technology.

In this embodiment, the face image and the voice of the character image 100 are captured and recorded in advance (namely, the face image and the voice are retrieved from the real character) and the retrieved face image and voice are further reproduced in the system 1; on the other hand, the body image of the character image 100 used in the system 1 can be the body image of a human body model, but embodiments are not limited thereto. In some embodiments, the body image and the voice of the character image 100 are captured in advance and are further reproduced in the system 1; on the other hand, the face image of the character image 100 can be the face image of a human body model.

In this embodiment, when the system 1 is operated, the facial expression is captured, by capturing the facial expression of a mold of the character or by capturing the facial expression of the real character. Alternatively, when the system 1 is operated, the voice is captured, by recording the voice of the real character. Furthermore, voice post-processing procedures may be applied to provide voice mixing or voice changing effects.

In this embodiment, the system 1 provides an interactive effect. Furthermore, where the face image of the character image 100 is the face image of a human body model, the facial expression of the character image 100 can be changed when the character image 100 is adapted to simulate that the character is talking, so that the changes of the virtual mouth expressions are recorded as a model, and the model can be applied to other human body models.

Augmented reality (AR) is a technique combining real objects and virtual objects for observing the real environment. Furthermore, the AR module 11 is widely used in gaming applications, field tours, business applications, and so on.

Moreover, the AR module 11 may use the image recognition technologies to detect and track a real object in the image and may use three-dimensional (3D) technologies to combine a preset three-dimensional avatar substrate with the character image 100 to form a three-dimensional avatar 104 on the display. The AR module 11 may be applied to AR glasses, an AR helmet, a smartphone with AR function, a computer with an AR function, or a robot with an AR function.

Figure 3:
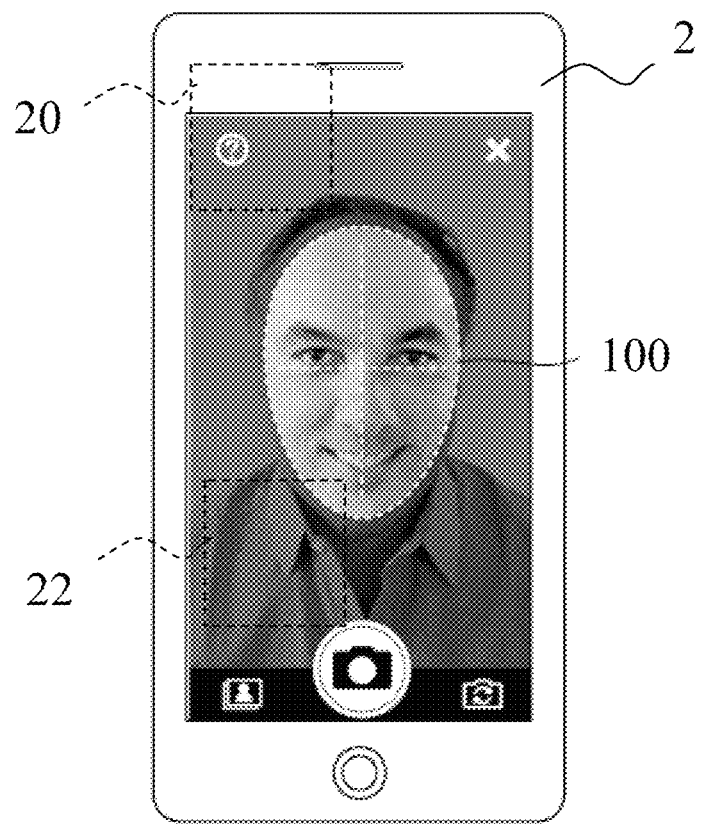
FIG. 3 illustrates an operational schematic view showing that a portable electronic device of the interactive camera system captures an image of a character image, according to one embodiment of the present invention.
Figure 4:
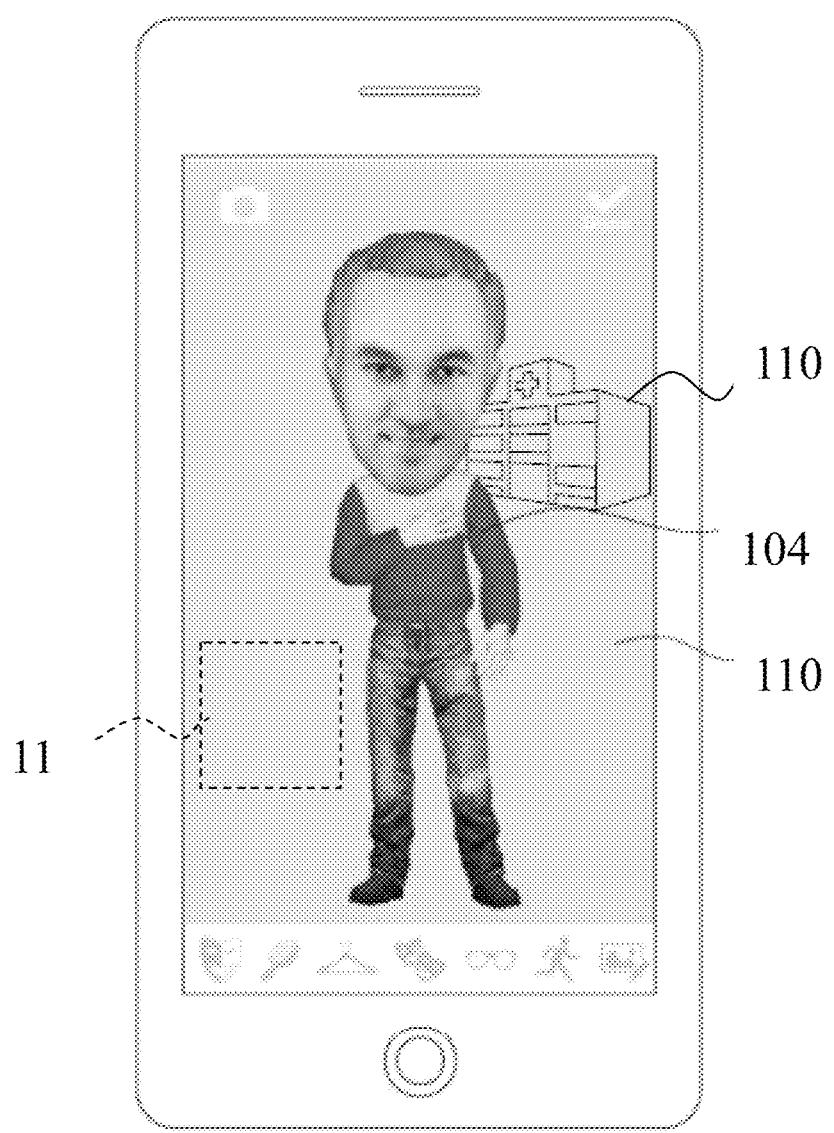
FIG. 4 illustrates an operational schematic view showing that the augmented reality (AR) module is activated, according to one embodiment of the present invention.

Furthermore, the virtual environment 110 (e.g., a hospital ward, a hospital lobby, or a virtual video studio capable of changing a background thereof) generated by the AR module 11, so that a user can combine a three-dimensional avatar substrate (which may be a human body model or a doll) with the character image 100 (as shown in FIG. 3) to form a three-dimensional avatar 104 (as shown in FIG. 4), and the three-dimensional avatar 104 can be displayed in the virtual environment. When the three-dimensional avatar substrate is a human body model, the accessory patterns 122 is selected from a group including eye, eyebrow, nose, mouth, body, face, hair, ear, neck, hand, and leg.

The accessory database 12 is provided for storing a plurality of accessory patterns 122. Furthermore, the accessory database 12 can be combined with a visual effect module 15, so that each of the accessory patterns 122 corresponds to different types of the three-dimensional avatar substrate, and each of the accessory patterns 122 is adapted to be selected and applied to the three-dimensional avatar substrate. The visual effect module 15 is further coupled to the AR module 11, and the visual effect module 15 provides a filtering effect with the pattern accessory 122 to be presented in the virtual environment 110. Therefore, the user can use the portable electronic device 2 to watch a human body model in a virtual environment or to share the human body model in the virtual environment to friends through communication applications of the portable electronic device 2; for example, the human body model in the virtual environment may be presented by a video file.

The voice database 13 is provided for storing a plurality of voice modules 130 with different voice effects. Different voice modules 130 can be used for writing different voice effects into the recorded voice file 102. Therefore, the voice effects in the voice database 13 can be combined with the recorded voice file 102 to provide voice mixing or voice changing effects.

In the virtual environment 110, the integration module 14 is adapted to integrate the three-dimensional avatar 104 with a selected accessory pattern 122 or with a selected voice module 130, to generate a video file that includes the three-dimensional avatar.

Furthermore, the system 1 may further comprise a shopping module 16, a document database 17, and a voice simulation processing module 18. The shopping module 16 is coupled to the AR module 11 and is adapted to obtain commodity information of an outer label unit and to import the commodity information into the virtual environment 110 to generate an augmented reality product image.

In other words, the commodity information of a product can be compiled as the outer label unit (which may be a barcode, a QR code, etc.), and a user can use the portable electronic device 2 to scan the label unit and to see the commodity information on the display of the portable electronic device 2, so that the user can understand entire information of the product (for example, information including the specification, price, place of production, websites, and so on). Hence, after the user checks the commodity information, the user then can purchase the product.

Moreover, the document database 17 is provided for storing document information. The document information may be personal introductions, thesis, articles, or reports. On the other hand, the voice simulation processing module 18 is coupled to the audiovisual capturing module 20 and the document database 17. Therefore, the recorded voice file 102 can be combined with the document information, and the recorded voice file 102 can be applied to read out the article in the document information via the virtual environment 110.

The procedure of the operation of the system 1 can be realized from FIG. 2. The AR module 11 in the portable electronic device 2 is applied to select the background, namely, the virtual environment 110 (may be a hospital ward, a hospital lobby, or a virtual video studio with a changeable background), and the character, namely, the three-dimensional avatar substrate (may be a human body model or a doll). Next, the character image 100 and the recorded voice file 102 are captured, and three-dimensional image file and ingredient information are generated. Last, the generated file and information can be shared to others through chat applications or social network media applications executed by the portable electronic device 2.

Figure 5:
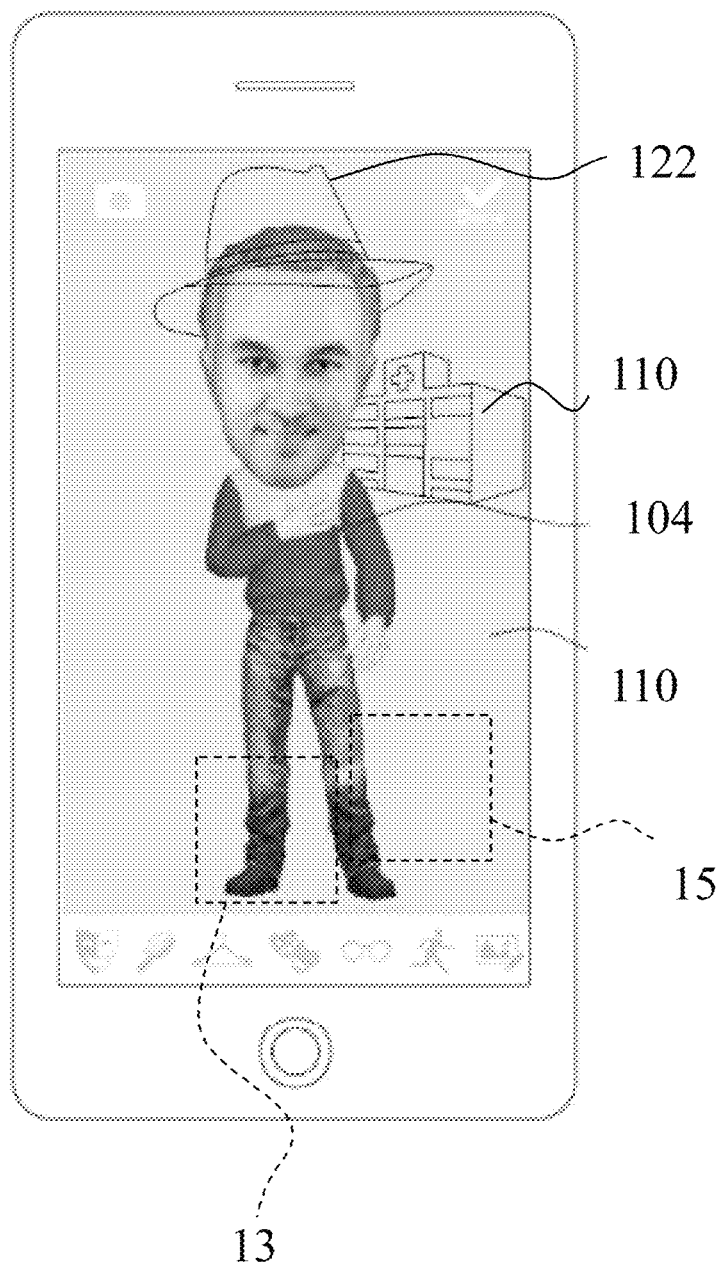
FIG. 5 illustrates an operational schematic view showing that the accessory patterns are imported into the interactive camera system according to one embodiment of the present invention.

Please refer to FIGS. 3 to 5, respectively illustrating an operational schematic view showing that the portable electronic device captures the image of the character image, an operational schematic view showing that the AR module is activated, and an operational schematic view showing that the accessory patterns are imported into the system.

As shown in FIG. 3, firstly, the audiovisual capturing module 20 of the portable electronic device 2 is adapted to capture an image of the head portion of the user to obtain the head portion image of the user. Alternatively, the audiovisual capturing module 20 of the portable electronic device 2 is also adapted to capture an image of the full body of the user to obtain the character image 100 (which may be a face image, a facial feature image, or a body image of the user). Next, the character image 100 and the recorded voice file 102 are stored in the storage module 22.

After the head portion image of the user is obtained, a processing module may be applied to recognize the face features using algorithms or using software programs, so that face feature data of the user can be generated.

Specifically, by using algorithms or software programs to recognize the head portion image of the user, so that specific areas like eyebrows, facial features, and face shape, or other representative portions on the user's face can be distinguished, and several points are applied to form the outline of these specific areas. Next, these points are captured as face feature points, and the face feature points are further combined with other contents of the head portion image to form the face feature data.

In FIG. 4, for example, the virtual environment 110 generated by the AR module 11 may be a hospital ward. When the character image 100 (which may be a doctor) is obtained, using the AR module 11, image recognition technologies can be applied to detect and track the real object in the image and may use three-dimensional technologies to combine a preset three-dimensional avatar substrate (which may be a human body model or a doll) with the character image 100 (as shown in FIG. 3) to form a three-dimensional avatar and display the three-dimensional avatar in the virtual environment 110.

In some embodiments, in the virtual environment 110, the body of the character image 100 may be combined with the three-dimensional avatar substrate. Therefore, such combination can be presented in the virtual environment 110, and the character in the virtual environment can have a variety of changes.

The technology may be applied to the introduction of medical services. For example, firstly, the face image of the doctor is recorded, so that the recorded facial expression files and mouth expression files can be outputted and applied to different human body models, thereby as compared with the typical video studio, reducing the costs. That is, it is understood that, in generating the virtual character for conventional movie application, the detect points over the user's face are detected and then applied to the formation of the virtual character (may be a human body model). In such condition, camera equipment and post processing apparatuses are required, and personnel for negotiating the location and designers are also needed. Furthermore, the movie actor has to wear wearable apparatus to allow the apparatus to detect the facial expressions. The wearable apparatus can generate sensing points (red points), and the facial features points on the user's face can be captured.

In FIG. 5, the accessory patterns 122 in the accessory database 12 are presented. Please refer to the figures of the present invention, different accessory patterns 122 may be combined with the visual effect module 15, so that each of the accessory patterns 122 can be selected to correspond to and to be applied to different types of three-dimensional avatar substrate. Furthermore, the accessory patterns 122 may be additional features on the face (e.g., the hair color, the beard style, and the skin color), or the accessory patterns 122 may be the accessory of the cloth.

Furthermore, the visual effect module 15 is further coupled to the AR module 11, and the visual effect module 15 provides a filtering effect with the pattern accessory 122 to be presented in the virtual environment 110. Moreover, different voice modules 130 stored in the voice database 13 can be used for writing different voice effects into the recorded voice file 102. Therefore, the voice effects in the voice database 13 can be combined with the recorded voice file 102 to provide voice mixing or voice changing effects.

Furthermore, the document information in the document database 17 may be combined with the voice module 130, and the document information may be personal introductions, thesis, articles, or reports. Therefore, the recorded voice file 102 can be applied to read out the article in the document information via the virtual environment 110.

Next, the integration module 14 is adapted to integrate the three-dimensional avatar 104 with a selected accessory pattern 122 or with a selected voice module 130, to generate a video file that includes the three-dimensional avatar. In other words, after the user completes the foregoing settings, the user can share, through chat applications or social network media applications executed by the portable electronic device 2, the generated human body model with different voice effects in the virtual environment 110 to present different article contents.

It is worth to note that, in this embodiment, when using the AR module 11 to perform a doctor presentation, different scenes can be changed when the portable electronic device 2 (e.g., a smartphone) is orientated toward different directions. For example, the virtual environment 110 may be changed between the hospital ward, the hospital lobby, and other places, and the virtual environment 110 may be a virtual video studio with a changeable background.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An interactive camera system with virtual reality technology, wherein the interactive camera system comprises:
   a portable electronic device for executing the system, wherein the portable electronic device has an audiovisual capturing module for obtaining at least one character image and a recorded voice file, and the portable electronic device has a storage module for storing the at least one character image and the recorded voice file;
   an augmented reality (AR) module for generating a virtual environment, in which a three-dimensional avatar substrate is combined with the character image to form a three-dimensional avatar and the three-dimensional avatar is adapted to be displayed in the virtual environment; wherein the AR module is adapted to select the virtual environment from a hospital ward, a hospital lobby, or a virtual studio capable of changing a background thereof;
   an accessory database for storing a plurality of accessory patterns, wherein each of the accessory patterns corresponds to the three-dimensional avatar substrate, and each of the accessory patterns is adapted to be selected and applied to the three-dimensional avatar substrate;
   a voice database for storing a plurality of voice modules, wherein the voice modules are corresponding to the three-dimensional avatar and are adapted to read the recorded voice file and change a voice effect of the recorded voice file;
   a shopping module coupled to the AR module, wherein the shopping module is adapted to obtain commodity information of an outer label unit and to import the commodity information into the virtual environment to generate an augmented reality product image; wherein the outer label unit allows the portable electronic device to scan to see the commodity information and purchase on the portable electronic device; and
   an integration module adapted to integrate the three-dimensional avatar with one of the accessory patterns corresponding to the three-dimensional avatar or to integrate the three-dimensional avatar with one of the voice modules corresponding to the three-dimensional avatar, to generate a video file that includes the three-dimensional avatar.

2. The interactive camera system according to claim 1, further comprising at least one visual effect module coupled to the AR module, wherein the visual effect module provides a visual effect in the virtual environment on the portable electronic device.

3. The interactive camera system according to claim 1, further comprising a document database for storing document information.

4. The interactive camera system according to claim 3, further comprising a voice simulation processing module coupled to the audiovisual capturing module and the document database, wherein the voice simulation processing module is adapted to combine the recorded voice file with the document information and presenting a combination of the recorded voice file and the document information in the virtual environment.

5. The interactive camera system according to claim 1, wherein the character image is a face image, a facial feature image, or a body image.

6. The interactive camera system according to claim 1, wherein the three-dimensional avatar substrate is a human body model or a doll.

7. The interactive camera system according to claim 1, wherein when the three-dimensional avatar substrate is a human body model, the accessory patterns is selected from a group including eye, eyebrow, nose, mouth, body, face, hair, ear, neck, hand, and leg.

8. The interactive camera system according to claim 1, wherein the AR module is adapted to be applied to AR glasses, an AR helmet, a smartphone with AR function, a computer with an AR function, or a robot with an AR function.

* * * * *